(12) United States Patent
Brichet et al.

(10) Patent No.: US 11,407,453 B2
(45) Date of Patent: Aug. 9, 2022

(54) INSULATING ELEMENT

(71) Applicant: SIKA TECHNOLOGY AG, Baar (CH)

(72) Inventors: Nicolas Brichet, Zürich (CH); Heinz Etterli, Besenbüren (CH)

(73) Assignee: SIKA TECHNOLOGY AG, Baar (CH)

( * ) Notice: Subject to any disclaimer, the term of this patent is extended or adjusted under 35 U.S.C. 154(b) by 17 days.

(21) Appl. No.: 17/052,257

(22) PCT Filed: May 17, 2019

(86) PCT No.: PCT/EP2019/062847
§ 371 (c)(1),
(2) Date: Nov. 2, 2020

(87) PCT Pub. No.: WO2019/224121
PCT Pub. Date: Nov. 28, 2019

(65) Prior Publication Data
US 2021/0086841 A1    Mar. 25, 2021

(30) Foreign Application Priority Data
May 23, 2018 (EP) ...................... 8173907

(51) Int. Cl.
*B60J 9/00* (2006.01)
*B62D 29/00* (2006.01)
*B60R 13/08* (2006.01)

(52) U.S. Cl.
CPC ............ *B62D 29/002* (2013.01); *B60R 13/08* (2013.01)

(58) Field of Classification Search
CPC .. H04L 5/0053; H04L 5/0007; H04W 72/042; H04W 72/0413; A61K 38/00; A44B 18/0049; B82Y 10/00; G10K 11/346; A61B 18/16; H01J 37/08
See application file for complete search history.

(56) References Cited

U.S. PATENT DOCUMENTS

| 5,266,133 A | 11/1993 | Hanley et al. |
| 5,373,027 A | 12/1994 | Hanley et al. |
| 6,131,897 A | 10/2000 | Barz et al. |

(Continued)

FOREIGN PATENT DOCUMENTS

| EP | 0204970 A2 | 12/1986 |
| EP | 1328415 B1 | 12/2007 |

(Continued)

OTHER PUBLICATIONS

Nov. 24, 2020 International Preliminary Report on Patentability issued in International Patent Application No. PCT/EP2019/062847.

(Continued)

*Primary Examiner* — Kiran B Patel
(74) *Attorney, Agent, or Firm* — Oliff PLC

(57) ABSTRACT

An insulating element for insulating a structural element in a vehicle including a base element, an additional element and a fixing element. The base element has a first coupling element and expandable material. The additional element has a second coupling element and expandable material. The base element and the additional element are connected to one another by the coupling elements.

13 Claims, 5 Drawing Sheets

(56) References Cited

U.S. PATENT DOCUMENTS

| | | |
|---|---|---|
| 6,253,524 B1 | 7/2001 | Hopton et al. |
| 6,387,470 B1 | 5/2002 | Chang et al. |
| 2002/0033617 A1* | 3/2002 | Blank .................... E04C 3/005 |
| | | 296/203.02 |
| 2017/0369004 A1* | 12/2017 | Brichet ................ B62D 29/002 |
| 2019/0144050 A1* | 5/2019 | Belpaire ............. B62D 29/002 |
| | | 296/187.01 |
| 2022/0073013 A1* | 3/2022 | Schulze ................. B32B 27/30 |

FOREIGN PATENT DOCUMENTS

| | | |
|---|---|---|
| EP | 2151369 A1 | 2/2010 |
| WO | 2005/080524 A1 | 9/2005 |

OTHER PUBLICATIONS

Jul. 13, 2019 International Search Report issued in International Patent Application No. PCT/EP2019/062847.

\* cited by examiner

INSULATING ELEMENT

The invention relates to an insulating element for insulating a structural element in a motor vehicle. It also relates to a method for insulating a structural element in a motor vehicle.

In many cases, components, such as for example bodies and/or frames of transportation and conveyance means, in particular of aquatic or terrestrial vehicles or of aircraft, have structures with cavities in order to make lightweight constructions possible. However, these cavities cause a wide variety of problems. Depending on the nature of the cavity, it has to be sealed in order to prevent the ingress of moisture and dirt, which can lead to corrosion of the components. It is often also desirable to substantially reinforce the cavities, and thus the component, but to retain the low weight. It is often also necessary for the cavities, and thus the components, to be stabilized in order for noises which would otherwise be transmitted along or through the cavity to be reduced. Many of these cavities have an irregular shape or a narrow extent, making it more difficult to seal, reinforce and insulate them properly.

In particular in automotive construction, but also in aircraft construction and boat building, sealing elements (baffles) are therefore used in order to seal and/or acoustically isolate cavities, or reinforcing elements (reinforcers) are used in order to reinforce cavities.

FIG. 1 schematically shows a body of an automobile. Here, the vehicle body 10 has various structures with cavities, such as for example pillars 14 and carriers or braces 12. Such structural elements 12, 14 with cavities are usually sealed and/or reinforced respectively by sealing and/or reinforcing elements 16.

It is a disadvantage of the previously known sealing and/or reinforcing elements that, for each vehicle body shape and for each cavity of a vehicle body, an individually adapted element has to be produced. This leads to high development and production costs and is disadvantageous in particular in the case of relatively small vehicle series.

It is therefore an object of the present invention to provide an improved insulating element for insulating a structural element in a motor vehicle, which avoids the disadvantages of the prior art. The insulating element is intended to give rise in particular to economic advantages in the case of small series and to reduce the development and production complexity of the insulating elements overall.

Said object is achieved by an insulating element for insulating a structural element in a vehicle, the insulating element comprising: a base element with a first coupling element, wherein the base element comprises expandable material; an additional element with a second coupling element, wherein the additional element comprises expandable material; and a fixing element for fixing the insulating element in the structural element; wherein the base element and the additional element are connected to one another by the coupling elements.

This solution has the advantage that, as a result, a base element can be used for a variety of usage situations. By combining the base element with a variety of additional elements, as a result insulating elements can be provided for various types of cavity in structural elements in the manner of a kit. Since the additional elements can be of very different configurations, in this case very differently shaped cavities in structural elements can also be insulated with the same base element and a different additional element combined respectively therewith.

A core concept of the present invention is that, first, a base element is provided. The base element is configured here for example such that it can be used to insulate a small, regularly shaped cavity of structural elements. One or else more additional elements are then joined to said base element, it being possible to use said additional elements as required for a specific (under certain circumstances irregularly shaped) cavity of a structural element. Thus, the base element can be produced in large numbers, and the additional elements can be produced for example by favorable production methods (in particular by extrusion or coextrusion). Thus, for small numbers or for trial tests and the like, a base element which can be favorably produced on account of large numbers can also be combined with an additional element which can be favorably produced. As a result, lower overall costs can be achieved than if an individually manufactured insulating element were to have to be produced for each cavity.

In the context of this invention, the designation "insulating element" or "insulation" or "insulated" comprises elements or structures or method steps for isolating and/or closing and/or reinforcing and/or insulating a structural element. This variety of characteristics of such an insulating element can in this case arise individually or else in combination with one another.

In one exemplary embodiment, the first coupling element and the second coupling element are formed such that the coupling elements are connected to one another by a form fit in a state in which they are connected to one another.

In one exemplary embodiment, the first coupling element and the second coupling element are in the form of a clip and an opening, with the result that the coupling elements can be latched into one another.

In one alternative embodiment, the first coupling element and the second coupling element are formed such that the coupling elements are connected to one another by a force fit in a state in which they are connected to one another.

In one exemplary embodiment, the first coupling element and the second coupling element are in the form of magnetic elements, with the result that the coupling elements can be connected to one another by means of magnetic forces.

In one exemplary embodiment, the base element and the additional element each have two or more coupling elements, with the result that the base element and the additional element are connected to one another at two or more locations.

The provision of two or else more coupling elements has the advantage that the additional element cannot be rotated in relation to the base element as a result. In particular, the provision of two coupling elements is advantageous because, as a result, on the one hand simple handling is ensured and on the other hand a secure and rotationally secured connection between the base element and the additional element can be achieved.

In one exemplary embodiment, the base element is formed without a carrier.

In one alternative embodiment, the base element has a carrier on which the expandable material is arranged.

The provision of such a carrier has the advantage that an expansion behavior of the expandable material can be better controlled as a result. The carrier stabilizes the expandable material during expansion and, depending on the configuration of the carrier, makes it possible for expansion to be guided in a desired direction.

In one exemplary embodiment, the carrier has a first plate, wherein the expandable material is arranged on one side of said first plate or on both sides of the first plate.

In one exemplary development, the carrier has a second plate, wherein the expandable material is arranged at least between the first plate and the second plate.

The provision of such plates as constituent parts of the carrier offers the advantage that a stable base for the expansion of the expandable material is provided as a result.

In one exemplary embodiment, the first plate and/or the second plate have/has openings which are arranged such that the expandable material can expand through said openings during expansion.

In one exemplary embodiment, the base element is produced by an injection molding process.

In one exemplary development, the base element is produced by a two-component injection molding process.

Since the base element can be produced in large numbers, an injection molding process is particularly suitable for producing the base element, since, in the case of injection molding processes, given large numbers the costs fall greatly. Accordingly, the base element can be produced in a cost-efficient manner in this way.

In one exemplary embodiment, the base element substantially has the shape of a cuboid.

In one exemplary alternative embodiment, the base element substantially has the shape of a cylinder.

In another exemplary alternative embodiment, the base element substantially has the shape of a cone.

In one exemplary development, the base element substantially has the shape of a cone of revolution.

In one exemplary embodiment, the additional element has a length which is at least twice a length of the base element.

In one exemplary development, the length of the additional element is at least three times the length of the base element.

The provision of an additional element which is long in comparison with the base element has the advantage that the additional element makes it possible to reach remote corners or secondary spaces that are difficult to access of the cavities to be filled with foam.

In one exemplary embodiment, the additional element is produced by an extrusion process.

In one exemplary development, the additional element is produced by a coextrusion process.

The use of an extrusion process for the additional element has the advantage that such extrusion processes make low costs possible even in the case of relatively small numbers, because expensive tools do not have to be manufactured for the extrusion process.

In one exemplary embodiment, the additional element has a carrier.

The provision of a carrier in the additional element has the advantage that, in turn, the expandable material can be supported by the carrier during expansion as a result. As a result, the expandable material can be expanded in a more targeted manner, such that on the one hand a better foam-filling of the cavity can be achieved, and on the other hand a maximum effect can be achieved with minimum use of the expandable material.

In one exemplary development, the carrier is integrated completely in the expandable material of the additional element.

In one alternative development, the carrier and the expandable material are formed in a layer-like manner.

In one exemplary embodiment, the additional element has an elongate cross section.

In one exemplary embodiment, the additional element has a substantially straight cross section.

In one alternative exemplary embodiment, the additional element has a curved or arcuate or wavy or serrated cross section.

In one exemplary embodiment, the fixing element is in the form of a separate element.

In one alternative embodiment, the fixing element is formed in one piece with the carrier of the base element.

In another alternative embodiment, the fixing element is formed in one piece with the carrier of the additional element.

In one exemplary embodiment, the fixing element together with the first coupling element or the second coupling element is in the form of a double clip.

Such a combination of first coupling element or second coupling element and the fixing element has the advantage that material costs can be saved as a result, by virtue of the fact that both the function of the fixing of the insulating element in the structural element and the connection of the base element to the additional element is achieved by a combined part.

In one exemplary embodiment, the fixing element is in the form of a clip.

In one alternative exemplary embodiment, the fixing element is in the form of a welding tab.

In another alternative embodiment, the fixing element is in the form of a magnetic material.

In another alternative exemplary embodiment, the fixing element is in the form of an adhesive.

In one exemplary embodiment, the base element is connected to a first additional element and to a second additional element.

In one exemplary development, the first additional element and the second additional element are arranged on the same side of the base element.

In one alternative development, the first additional element and the second additional element are arranged on different sides of the base element, in particular on opposite sides of the base element.

In principle, any desired material that can be made to foam can be used as the expandable material. This material may or may not have reinforcing properties. The foamable material is typically foamed thermally, by moisture or by electromagnetic radiation.

Such an expandable material typically has a chemical or a physical foaming agent. Chemical foaming agents are organic or inorganic compounds which decompose under the influence of temperature, moisture or electromagnetic radiation, wherein at least one of the decomposition products is a gas. Compounds which transition into the gaseous aggregate state when the temperature is increased may for example be used as physical foaming agents. As a result, both chemical and physical foaming agents are capable of creating foam structures in polymers.

The expandable material is preferably foamed thermally, with chemical foaming agents being used. Examples of suitable chemical foaming agents are azodicarbonamides, sulfohydrazides, hydrogen carbonates or carbonates.

Suitable foaming agents are, for example, also commercially available under the trade name Expancel® from Akzo Nobel, the Netherlands, or under the trade name Celogen® from Chemtura Corp., USA.

The heat required for the foaming can be introduced by external or by internal heat sources, such as an exothermic chemical reaction. The foamable material can preferably be foamed at a temperature of <160° C., in particular from 80° C. to 150° C., preferably from 90° C. to 140° C.

Suitable expandable materials are, for example, one-component epoxy resin systems which do not flow at room temperature and in particular have increased impact resistance and contain thixotropic agents such as aerosils or nanoclays. For example, epoxy resin systems of this type include 20 to 50% by weight of a liquid epoxy resin, 0 to 30% by weight of a solid epoxy resin, 5 to 30% by weight of impact modifiers, 1 to 5% by weight of physical or chemical foaming agents, 10 to 40% by weight of fillers, 1 to 10% by weight of thixotropic agents and 2 to 10% by weight of heat-activatable catalysts. Suitable impact modifiers are reactive liquid rubbers based on nitrile rubber or derivatives of polyether polyol polyurethanes, core-shell polymers and similar systems known to a person skilled in the art.

Likewise suitable expandable materials are one-component polyurethane compositions containing foaming agents and based on crystalline polyesters which comprise OH groups and have been mixed with further polyols, preferably polyether polyols, and polyisocyanates with blocked isocyanate groups. The melting point of the crystalline polyester should be >50° C. The isocyanate groups of the polyisocyanate can be blocked for example by nucleophiles such as caprolactam, phenols or benzoxalones. Also suitable are blocked polyisocyanates such as are used, for example, in powder-coating technology and are commercially available, for example, under the trade names Vestagon® BF 1350 and Vestagon® BF 1540 from Degussa GmbH, Germany. Also as isocyanates are so-called encapsulated or surface-deactivated polyisocyanates which are known to a person skilled in the art and are described, for example, in EP 0 204 970.

Also suitable as expandable materials are two-component epoxy/polyurethane compositions which contain foaming agents, such as are described, for example, in WO 2005/080524 A1.

Also suitable as expandable materials are ethylene-vinyl acetate compositions containing foaming agents.

Expandable materials that are likewise suitable are marketed by Sika Corp., USA, for example under the trade name SikaBaffle® 240, SikaBaffle® 250 or SikaBaffle® 255, and are described in patents U.S. Pat. Nos. 5,266,133 and 5,373,027. Such expandable materials are particularly preferred for the present invention.

Preferred expandable materials with reinforcing properties are for example those marketed by Sika Corp., USA under the trade name SikaReinforcer® 941. These are described in U.S. Pat. No. 6,387,470.

In one exemplary embodiment, the expandable material has an expansion rate from 800% to 4000%, preferably from 1000% to 3000%, particularly preferably from 1500% to 3000%.

Expandable materials with such expansion rates offer the advantage that, as a result, reliable sealing or insulation of the structural element with respect to liquids and sound can be achieved.

In one exemplary embodiment, the expandable material is in the form of a temperature-stimulated material.

This has the advantage that, as a result, the furnace for baking the dip coating liquid can be used to expand the expandable material and to thus insulate the cavity. Consequently, an additional work step is not necessary.

The carrier may consist of any desired materials. Preferred materials are plastics, in particular polyurethanes, polyamides, polyesters and polyolefins, preferably polymers which can withstand high temperatures such as poly(phenylene ethers), polysulfones or polyether sulfones, which in particular are also foamed; metals, in particular aluminum and steel; or grown organic materials, in particular wood materials or other (densified) fibrous materials, or glass-type or ceramic materials; especially also foamed materials of this type; or any desired combinations of these materials. Polyamide, in particular polyamide 6, polyamide 6.6, polyamide 11, polyamide 12, or a mixture thereof, is particularly preferably used.

Furthermore, the carrier may have any desired construction and any desired structure. It may for example be solid, hollow or foamed, or have a grid-like structure. Typically, the surface of the carrier may be smooth, rough or structured.

In the case of insulating elements in which the expandable material is located on a carrier, the production process differs according to whether the carrier consists or does not consist of a material that can be processed by injection molding. In the affirmative, a two-component injection molding process is usually used. In this case, first of all a first component, in this case the carrier, is injected. After said first component has solidified, the cavity in the mold is enlarged, or adapted, or the molding produced is placed into a new mold, and a second component, in this case the expandable material, is overmolded onto the first component by a second injection apparatus.

If the carrier consists of a material that cannot be produced by the injection molding process, that is to say for example of a metal, the carrier is placed into a corresponding mold and the expandable material is overmolded onto the carrier. Of course, it is also possible to fasten the expandable material to the carrier by specific fastening means or processes.

Furthermore, carriers can also be produced by other processes, for example by extrusion.

In one exemplary embodiment, the carrier and the expandable material are produced in one step in a coextrusion process. In order to produce a base element or an additional element, the coextrudate can be cut to length.

The object set in the introduction is additionally achieved by a system in a motor vehicle, the system comprising: a structural element which has a cavity; and an insulating element according to the description above; wherein the insulating element is arranged in the cavity of the structural element.

In one exemplary embodiment, the structural element is a portion of a column or of a carrier or of a brace of a motor vehicle body.

The object set in the introduction is additionally achieved by a method for insulating a structural element in a motor vehicle, the method comprising the steps of: providing a structural element having a cavity; coupling a base element to an additional element in order to form an insulating element, wherein the base element comprises expandable material and wherein the additional element comprises expandable material; arranging the insulating element in the cavity of the structural element; and expanding the expandable material, as a result of which a cross section of the structural element is substantially closed by the insulating element having the expanded material.

In one exemplary embodiment, when the insulating element is being arranged in the cavity of the structural element, a fixing element of the insulating element is latched into an opening in the structural element.

In one exemplary embodiment, when the expandable material is being expanded, the insulating element is exposed to an elevated temperature.

In one exemplary development, the insulating element is heated to at least 120° C. in the process.

In one exemplary embodiment, the base element is coupled to the additional element before the insulating element is arranged in the cavity of the structural element.

In one exemplary embodiment, the method is carried out with an above-described insulating element.

Details and advantages of the invention will be described below on the basis of exemplary embodiments and with reference to schematic drawings, in which.

Figure 1:
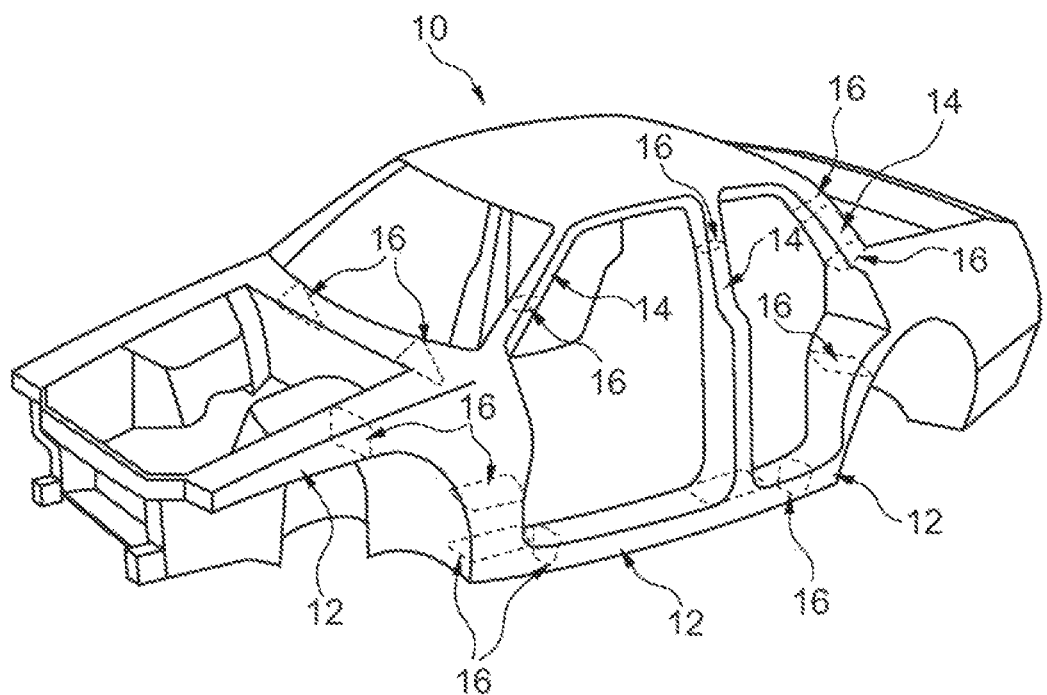
FIG. 1 shows an exemplary illustration of a vehicle body according to the prior art.
Figure 2A:
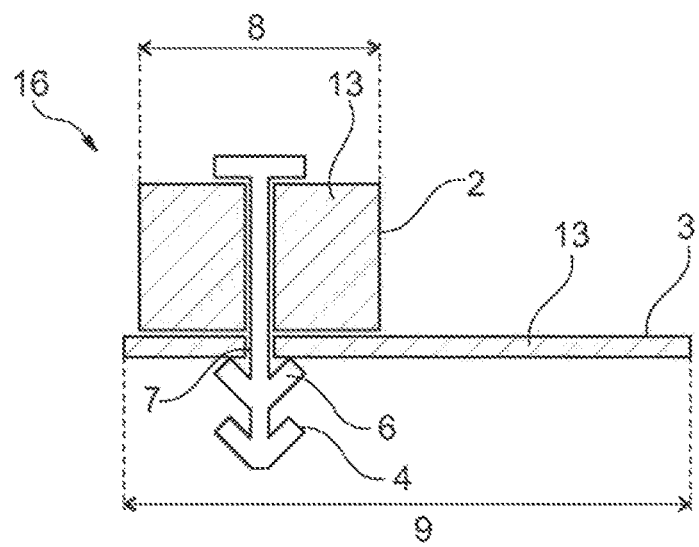
FIGS. 2a to 2c show a schematic illustration of an exemplary insulating element which is arranged and expanded in a structural element.
Figure 2B:
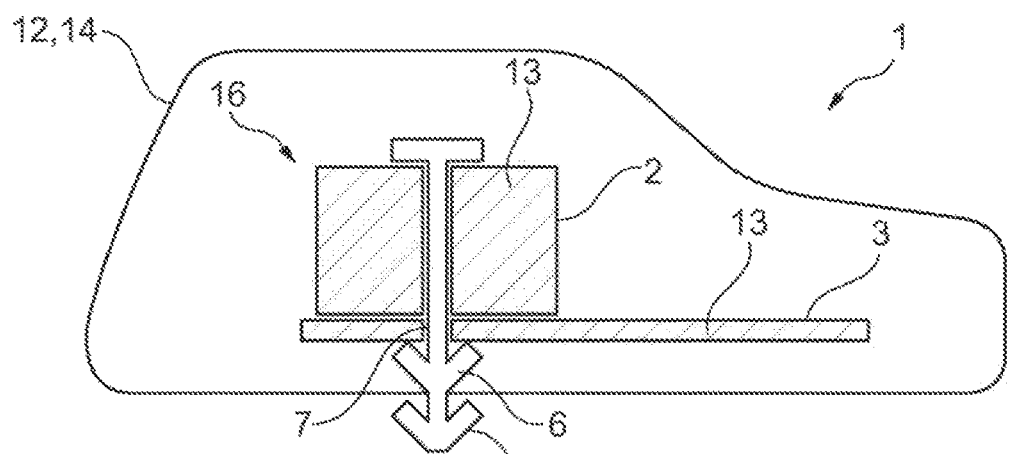
Figure 2C:
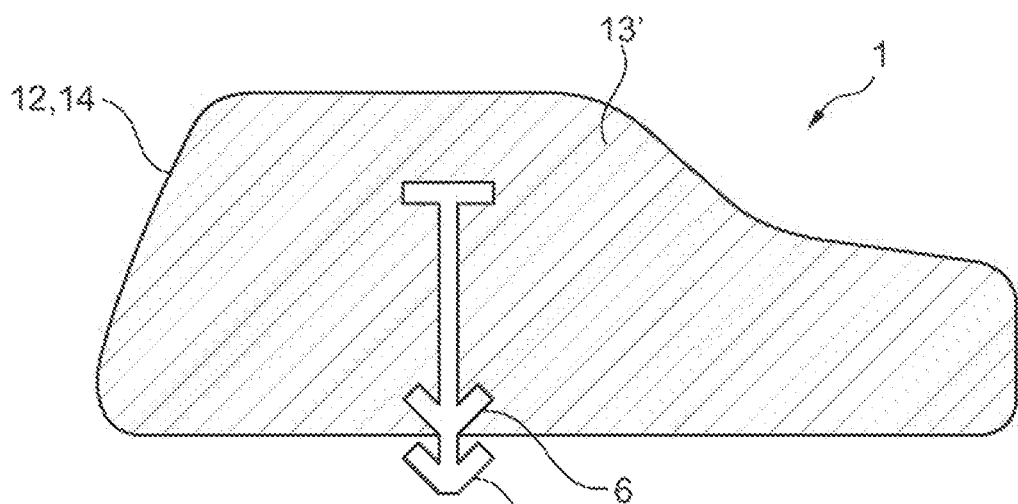

FIGS. 2a to 2c illustrate by way of example how an insulating element 16 can be arranged in a structural element 12, 14, and how the expansion of the expandable material 13 makes it possible to fill or close the cavity of the structural element 12, 14 by means of the expanded material 13'.

In FIG. 2a, only the insulating element 16 is initially illustrated. The insulating element 16 comprises a base element 2, an additional element 3 and a fixing element 4. The base element comprises a first coupling element 6, which in this exemplary embodiment is in the form of part of a double clip, and the additional element 3 comprises a second coupling element 7, which in this exemplary embodiment is in the form of an opening in the expandable material 13.

In the exemplary embodiment, both the base element 2 and the additional element 3 are configured without a carrier.

In this exemplary embodiment, in order to connect the base element 2 to the additional element 3, a first coupling element 6 in the form of a clip with an anchor is used. By guiding said clip 6 with an anchor through an opening in the expandable material 13 of the base element 2 and also through an opening in the expandable material 13 in the additional element 3, the base element 2 and the additional element 3 are connected to one another.

As can be seen in FIG. 2a, the base element 2 has a length 8 and the additional element 3 has a length 9. In this exemplary embodiment, the length 9 of the additional element 3 is more than twice the length 8 of the base element 2.

The manner in which said insulating element 16 can be fixed in the structural element 12, 14 can be seen in FIG. 2b. In the process, the fixing element 4 is connected to the structural element 12, 14. In this exemplary embodiment, the fixing element 4 is in the form of a constituent part of a double clip together with the first coupling element 6. In order to connect the insulating element 16 to the structural element 12, 14, the clip of the fixing element 4 is guided through an opening in the structural element 12, 14, with the result that the insulating element 16 is latched in the structural element 12, 14.

FIG. 2b illustrates the insulating element 16 before the expandable material 13 both of the base element 2 and the additional element 3 has expanded.

FIG. 2c then illustrates a situation after the expandable material 13 has expanded. In the process, the expanded material 13' closes or fills the entire cavity of the structural element 12, 14. In this situation, both the expanded material 13' of the base element 2 and the expanded material 13' of the additional element 3 are in an expanded state.

FIGS. 3a to 3f illustrate various exemplary embodiments of base elements 2. In these exemplary embodiments, the base element 2 has a carrier 11 in addition to the expandable material 13 in each case.

Figure 3A:
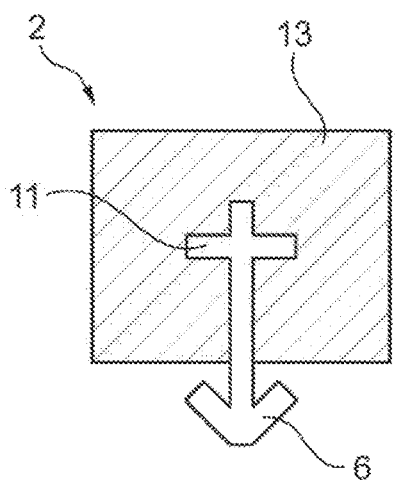

In FIG. 3a, the carrier 11 is formed with a cross-like cross section which is anchored in the expandable material 13. The first coupling element 6 for connection to the additional element (not illustrated in this figure) is depicted on said cross-like carrier 11.

Figure 3B:
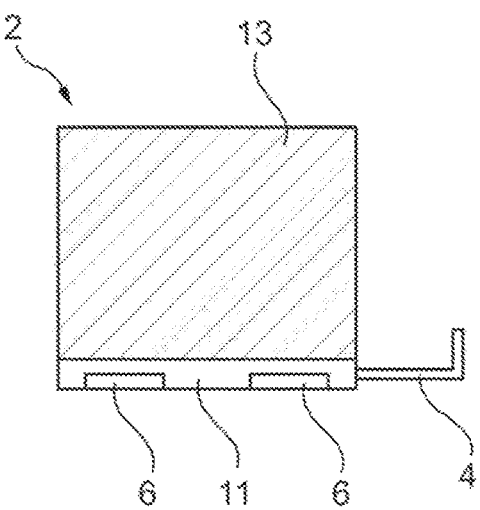

In FIG. 3b, the base element 2 is formed likewise with a carrier 11 and with expandable material 13 arranged thereon. In this exemplary embodiment, the base element 2 has two first coupling elements 6 which are both integrated in the carrier 11 as magnetic materials. In addition, a fixing element 4 is arranged on the carrier 11 and in this exemplary embodiment is configured as a welding tab.

Figure 3C:
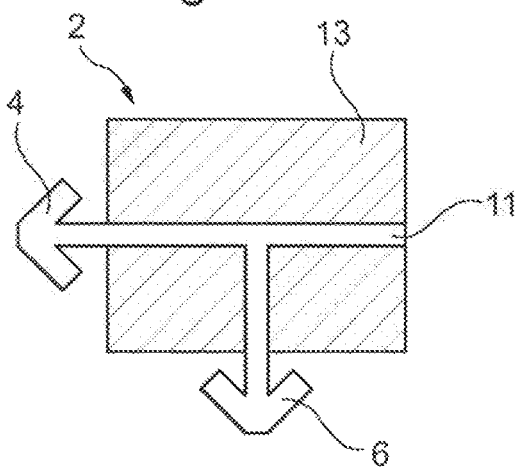

FIG. 3c illustrates a further exemplary embodiment of a base element 2. In this exemplary embodiment, formed on the carrier 11 are both the first coupling element 6 in the form of a clip and the fixing element 4, which is likewise configured in the form of a clip.

Figure 3D:
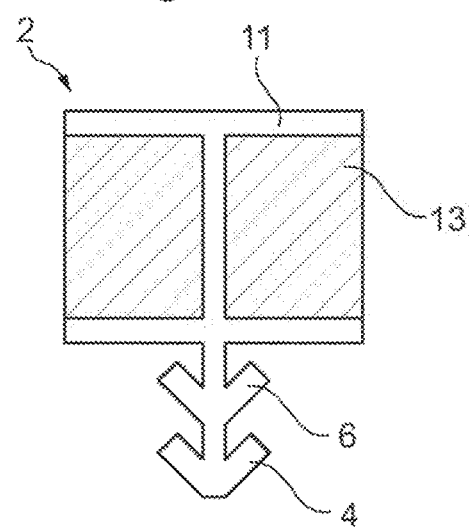

FIG. 3d illustrates a further exemplary base element 2. In this exemplary embodiment, the carrier 11 of the base element 2 has a first plate and a second plate. The expandable material 13 is arranged between these plates of the carrier 11 in this case. Furthermore, the first coupling element 6 and the fixing element 4 are formed on the carrier 11 of the base element 2 in the form of a double clip.

Figure 3E:
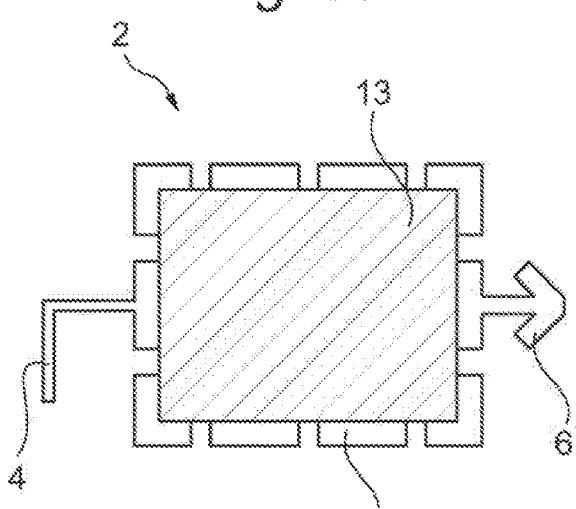

FIG. 3e illustrates a further exemplary base element 2. In this exemplary embodiment, the expandable material 13 is substantially encompassed by the carrier 11. In this case, the carrier 11 has openings, through which the expandable material 13 can expand during expansion. In addition, arranged on the carrier 11 are both the fixing element 4 in the form of a welding tab and the first coupling element 6 in the form of a clip.

Figure 3F:
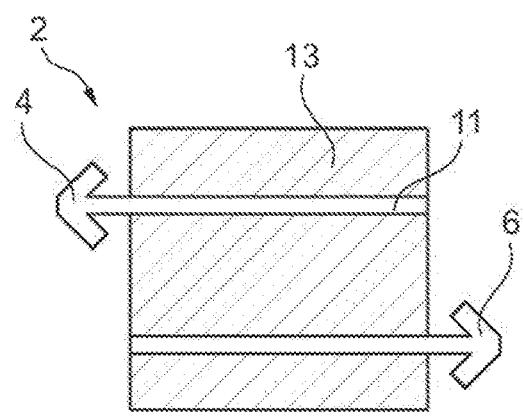

FIG. 3f illustrates a further exemplary base element 2. In this exemplary embodiment, the base element 2 once again has an expandable material 13 and a carrier 11. In this exemplary embodiment, the carrier 11 comprises a first plate and a second plate. In this case, the fixing element 4 is arranged on the first plate, and the first coupling element 6 is arranged on the second plate of the carrier 11.

FIGS. 4a to 4e illustrate various exemplary embodiments of additional elements 3.

Figure 4A:
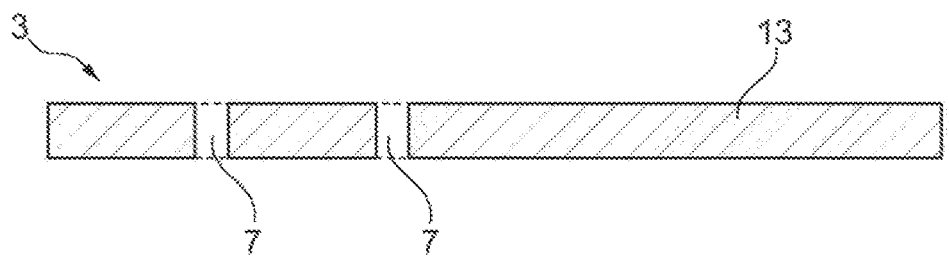
FIGS. 4a to 4e show schematic illustrations of exemplary additional elements.

FIG. 4a illustrates a first exemplary additional element 3. This additional element 3 comprises an expandable material 13 but does not comprise a carrier. In this exemplary embodiment, the second coupling elements 7 are configured as openings in the expandable material 13.

Figure 4B:

FIG. 4b illustrates a second exemplary additional element 3. By contrast to the additional element 3 in FIG. 4a, this additional element 3 has a carrier 11 in addition to the expandable material 13. The second coupling element 7, which is configured as a clip, is formed on said carrier 11. The expandable material 13 is arranged in a layer-like manner on both sides of the carrier 11.

Figure 4C:
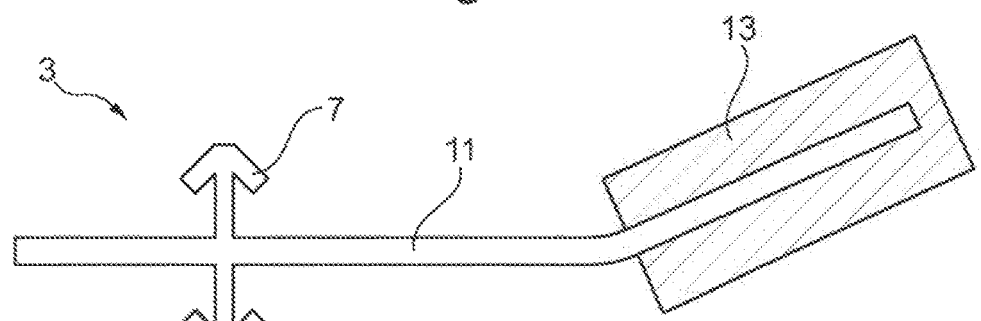

FIG. 4c illustrates a third exemplary embodiment example of an additional element 3. This additional element 3 has a carrier 11, on which the second coupling element 7 and also the fixing element 4 are arranged. The expandable material 13 is arranged at an arcuate end of the carrier 11 and encloses this arcuate end of the carrier 11 completely.

Figure 4D:
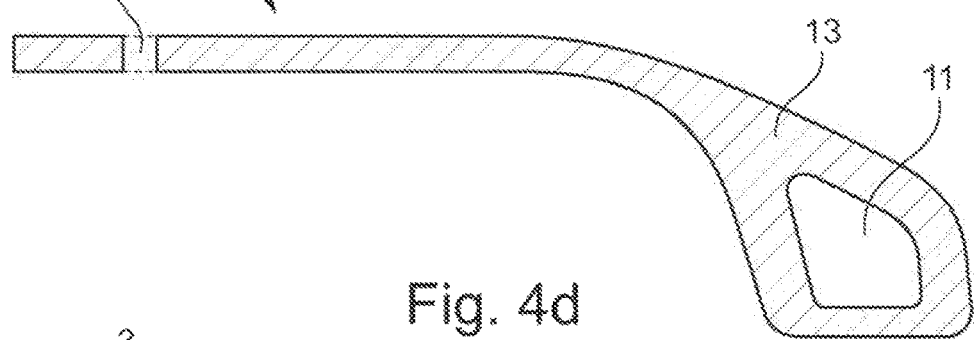

FIG. 4d illustrates a fourth exemplary embodiment of an additional element 3. In this exemplary embodiment, the additional element 3 comprises a carrier 11, which is enclosed completely by the expandable material 13, in addition to the expandable material 13. In this exemplary embodiment, the second coupling element 7 is in the form of an opening in the expandable material 13.

Figure 4E:
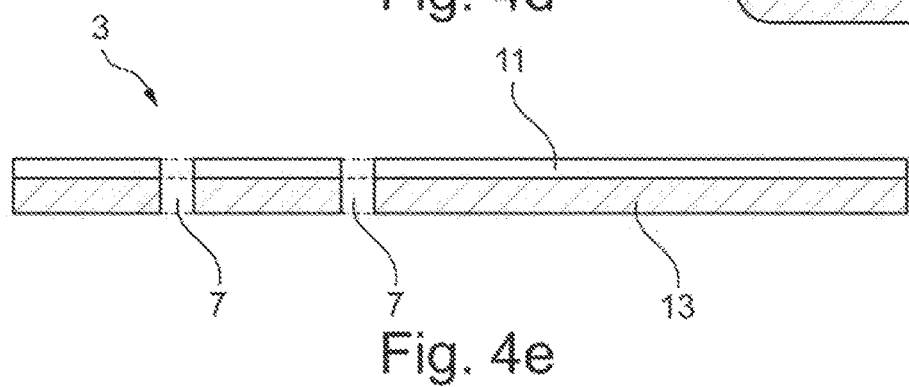

FIG. 4e illustrates a fifth exemplary embodiment of an additional element 3. In this exemplary embodiment, a carrier 11 and the expandable material 13 are arranged next to one another in a layer-like manner. The second coupling elements 7 are configured as openings which reach through both the carrier 11 and the expandable material 13. Such an additional element 3 can be produced for example by a coextrusion process.

Figure 5A:
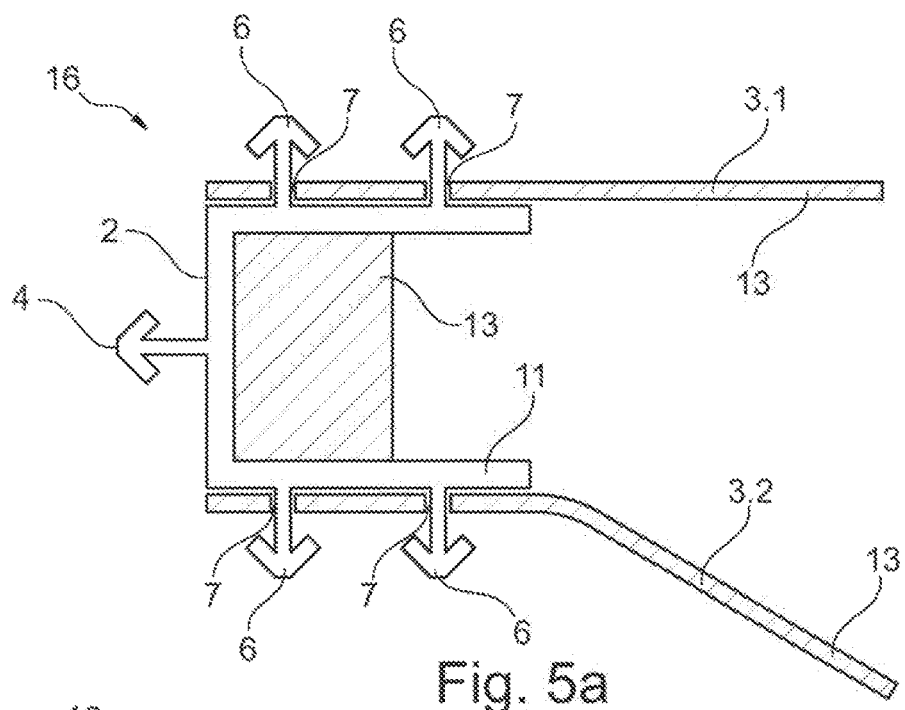
FIGS. 5a to 5c show schematic illustrations of exemplary insulating elements.
Figure 5B:
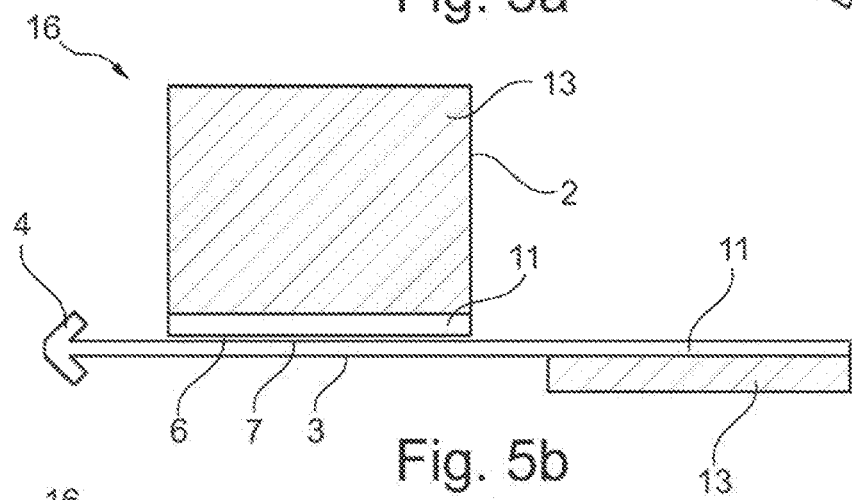
Figure 5C:
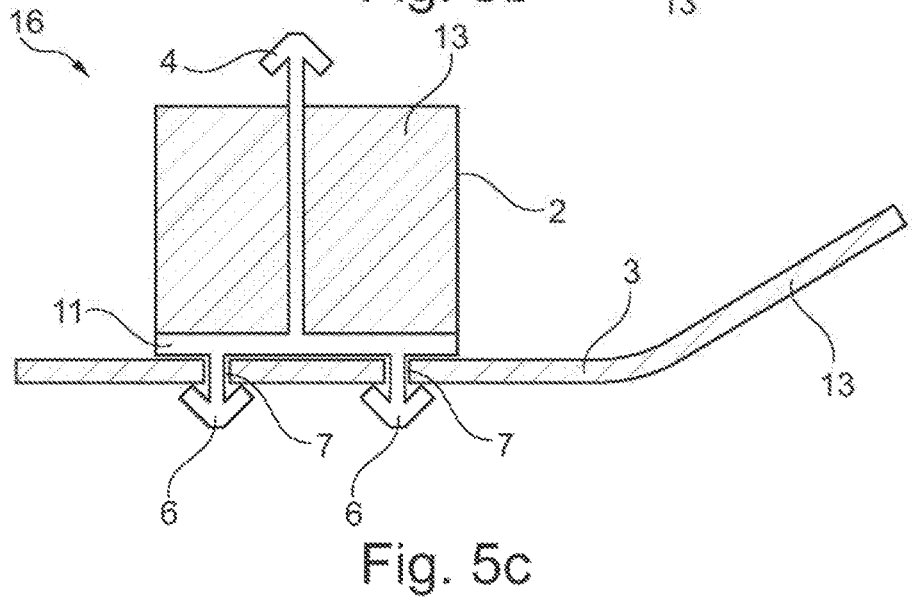

FIGS. 5a to 5c illustrate various exemplary insulating elements 16.

FIG. 5a illustrates an insulating element 16 which comprises a first additional element 3.1 and a second additional element 3.2 in addition to the base element 2 and the fixing element 4. In this exemplary embodiment, the additional elements 3.1, 3.2 are in the form of elongate expandable materials 13, in each case without a carrier. First coupling elements 6 of the base element 2 are configured as clips, which are latched in the two coupling elements 7 of the additional elements 3.1, 3.2 which are configured as openings.

FIG. 5b illustrates a further exemplary insulating element 16. In this insulating element, both the base element 2 and the additional element 3 respectively have a carrier 11 in addition to the expandable material 13. In this exemplary embodiment, the fixing element 4 is formed on the carrier 11 of the additional element 3. In this exemplary embodiment, the coupling elements 6, 7 are configured with at least one adhesive layer, which adhesively bonds the carriers 11 of the base element 2 and of the additional element 3 to one another.

FIG. 5c illustrates a further exemplary insulating element 16. In this exemplary embodiment, the base element 2 has a carrier 11, but the additional element 3 is formed without a carrier. The fixing element 4 in the form of a clip is formed on the carrier 11 of the base element 2. In addition, configured on the carrier 11 of the base element 2 are two first coupling elements 6 in the form of clips, which are latched in the second coupling elements 7 which are in the form of openings in the expandable material 13 of the additional element 3.

LIST OF REFERENCE SIGNS

1 System
2 Base element
3 Additional element
3.1 First additional element
3.2 Second additional element
4 Fixing element
6 First coupling element
7 Second coupling element
8 Length of the base element
9 Length of the additional element
10 Vehicle body
11 Carrier
12 Structural element
12 Expandable material
13' Expanded material
14 Structural element
16 Insulating element

The invention claimed is:

1. An insulating element for insulating a structural element in a motor vehicle, the insulating element comprising:
a base element with a first coupling element, wherein the base element comprises expandable material;
an additional element with a second coupling element, wherein the additional element comprises expandable material; and
a fixing element for fixing the insulating element in the structural element;
wherein the base element and the additional element are connected to one another by the coupling element.

2. The insulating element as claimed in claim 1, wherein the first coupling element and the second coupling element are in the form of a clip and an opening, with the result that the coupling elements can be latched into one another.

3. The insulating element as claimed in claim 1, wherein the base element and the additional element each have two or more coupling elements, with the result that the base element and the additional element are connected to one another at two or more locations.

4. The insulating element as claimed in claim 1, wherein the base element has a carrier on which the expandable material is arranged.

5. The insulating element as claimed in claim 4, wherein the carrier has a first plate, and wherein the expandable material is arranged on one side of the plate or on both sides of the plate.

6. The insulating element as claimed in claim 5, wherein the carrier has a second plate, and wherein the expandable material is arranged at least between the first plate and the second plate.

7. The insulating element as claimed in claim 1, wherein the base element is produced by an injection molding process.

8. The insulating element as claimed in claim 1, wherein the additional element has a length which is at least twice a length of the base element.

9. The insulating element as claimed in claim 1, wherein the additional element is produced by an extrusion process.

10. The insulating element as claimed in claim 1, wherein the additional element has a carrier.

11. The insulating element as claimed in claim 1, wherein the fixing element is in the form of a separate element or is formed in one piece with the carrier of the base element or in one piece with the carrier of the additional element.

12. The insulating element as claimed in claim 1, wherein the fixing element together with the first coupling element or the second coupling element is in the form of a double clip.

13. A system in a motor vehicle, the system comprising:
a structural element which has a cavity; and
an insulating element as claimed in claim 1;
wherein the insulating element is arranged in the cavity of the structural element.

* * * * *